United States Patent [19]
Kellogg

[11] 3,900,118
[45] Aug. 19, 1975

[54] LOADING TAILGATE FOR TRUCKS

[76] Inventor: James R. Kellogg, Rt. 2, Meridian, Idaho 83642

[22] Filed: May 20, 1974

[21] Appl. No.: 471,587

[52] U.S. Cl. .................. 214/84; 193/37; 296/57
[51] Int. Cl. ............................................ B60p 1/52
[58] Field of Search ............ 296/51, 57; 214/84, 82; 193/37

[56] References Cited
UNITED STATES PATENTS

| | | | |
|---|---|---|---|
| 2,079,790 | 5/1937 | Colorigh | 214/84 |
| 2,678,740 | 5/1954 | Jones | 214/84 |
| 2,711,342 | 6/1955 | Selzer | 296/51 X |
| 2,747,476 | 5/1956 | Manuel | 296/51 X |

Primary Examiner—Leo Friaglia
Attorney, Agent, or Firm—Robert G. McMorrow

[57] ABSTRACT

A loading tailgate for a truck body in which the tailgate is hingedly connected between truck side frames. The tailgate has a roller assembly operatively mounted at its upper portion whereby materials to be placed in the truck are loaded over the tailgate whether the tailgate is in vertical or horizontal position. The roller is of segmented construction and has a braking system to impede or stop movement of the rollers.

3 Claims, 8 Drawing Figures

3,900,118

3,900,118

LOADING TAILGATE FOR TRUCKS

BACKGROUND OF THE INVENTION

1. Field of the Invention

This invention pertains to loading devices for vehicles, and more particularly to a truck tailgate loader which is fully operative notwithstanding the position of the tailgate relative to the truck bed. 2. Statement of the Prior Art Roller assisted loading means have heretofore been incorporated in vehicles of various types. Examples are shown in the below listed prior patents:

| Patent No. | Patentee | Issue Date |
| --- | --- | --- |
| 2,079,790 | Colorigh | May 11, 1937 |
| 2,551,074 | Walford | May 1, 1951 |
| 2,678,740 | Jones | May 18, 1954 |
| 2,716,499 | Grant | Aug. 30, 1955 |
| 2,799,409 | Kelly | July 16, 1957 |
| 2,958,432 | Milheim | Nov. 1, 1960 |
| 3,006,487 | Gelli | Oct. 31, 1961 |
| 3,311,246 | Jones | March 28, 1967 |

SUMMARY OF THE INVENTION

The placement of elongated heavy objects in truck beds represents a problem, particularly where such objects must be loaded without assistance. The body loading is not only difficult to accomplish, but often damages the truck edge. The present invention provides a roller mounted in the upper end section of the vehicle tailgate. This results in improved loading despite the position of the tailgate. Thus, objects may be loaded using the roller whether the tailgate is in vertical, intermediate, or horizontal position.

The present invention is ideally provided in newly constructed vehicles, but may be added as an accessory item to existing vehicles.

The preferred mounting of the roller positions the apparatus partially between the wall panels of the tailgate, thereby preserving the appearance of the vehicle.

The system hereof incorporates a dual roller system whereby it is employed to advantage when the truck is partially loaded with materials which extend over the tailgate at one side thereof.

It is an important feature of this invention to provide a braking system which is operative to either impede or completely lock the rollers when desired so as to avoid injuries from accidental slippage and to provide stability during transport.

Other and further objects and advantages of the invention will become apparent to those skilled in the art from a consideration of the following specification when read in conjunction with the annexed drawings.

DESCRIPTION OF THE PREFERRED EMBODIMENT

Figure 1:
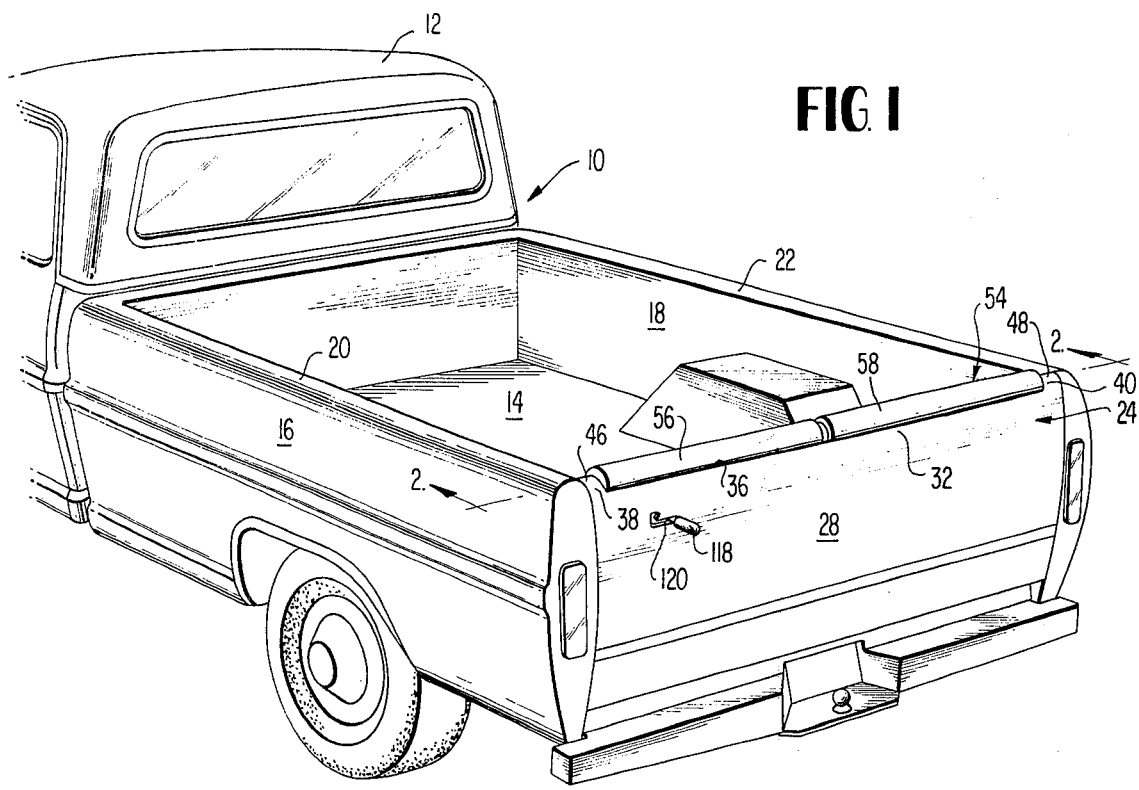
FIG. 1 is a perspective view showing a portion of a truck having a loading roller assembly in accordance with this invention incorporated therein.

Referring to the drawing in more detail, a truck 10 of otherwise conventional construction but employing the invention hereof is therein shown. The truck 10 may be of any selected design, and conventionally includes a cab section 12 forwardly of a load bed 14. Extending vertically from the opposite sides of the bed 14 are side frame panels 16 and 18 having top edges 20, 22 respectively.

The loading tailgate of this invention as shown herein is generally identified by reference character 24. The tailgate per se includes inner and outer panel walls 26 and 28 and end walls 27, 29, the tailgate being hingedly connected between the side frames by any conventional tailgate mount (not shown). The panels 26 and 28 each has a top section 30, 32 which include indented central sections 34, 36. At the sides of the indented section 36 are elevated side portions 38 and 40, and elevated side portions 42, 44 are similarly situated relative to the indented section 34. The indented sections are co-aligned and define an open slot in the top section of the tailgate.

The respective elevated side portions 38, 42 and 40, 44 are spanned by preferably integral cover walls 46 and 48.

Figure 2:
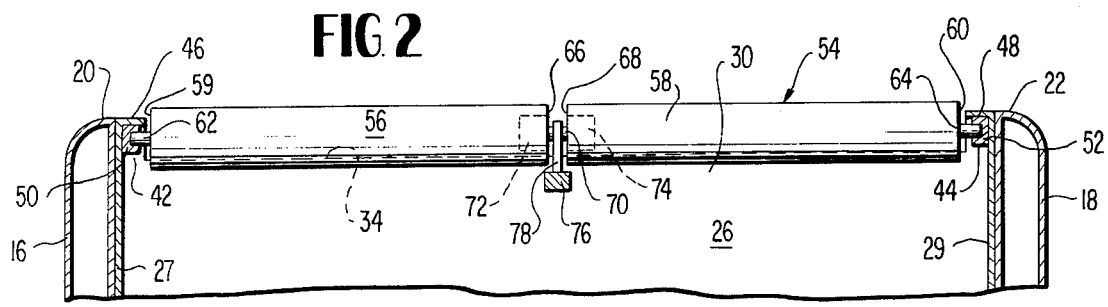
FIG. 2 is an enlarged sectional view showing details, taken on line 2—2 of FIG. 1, looking in the direction of the arrows.

The means for mounting of the loading roller hereof comprises a pair of bearings comprising cup members 50 and 52, each having an open, inwardly facing bore. These bearings are mounted, as shown in FIG. 2, in fixed positions against the tailgate end walls 27, 29 and against the cover walls 46 and 48.

The roller means 54 per se comprises a pair of elongated, substantially cylindrical roller members 56, 58 constructed of any suitable material such as chrome plated steel, and having opposite outer ends 58 and 60. Stub axles 62, 64 project axially from these ends and are rotatably seated in the bearings 50 and 52. Adjacent inner ends 66, 68 of the rollers are spanned by a connecting axle 70 which is mounted in suitably recessed bearings 72, 74 thereof. A block 76 extending between the panels 28 and 30 has an upward support arm 78 through which the axle 70 extends. The bearings permit rotation of one roller or the other without movement of both.

Figure 5:
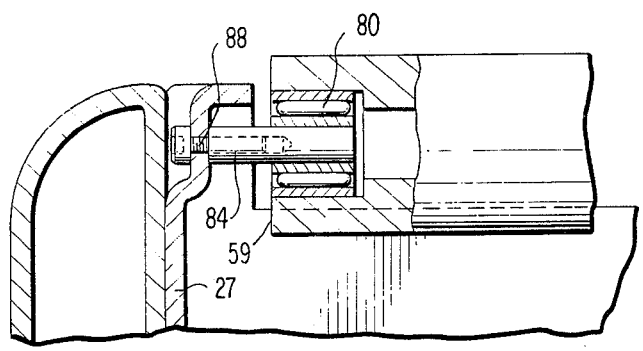
FIG. 5 is an enlarged sectional view showing an alternate form of end bearing mount hereof.
Figure 6:
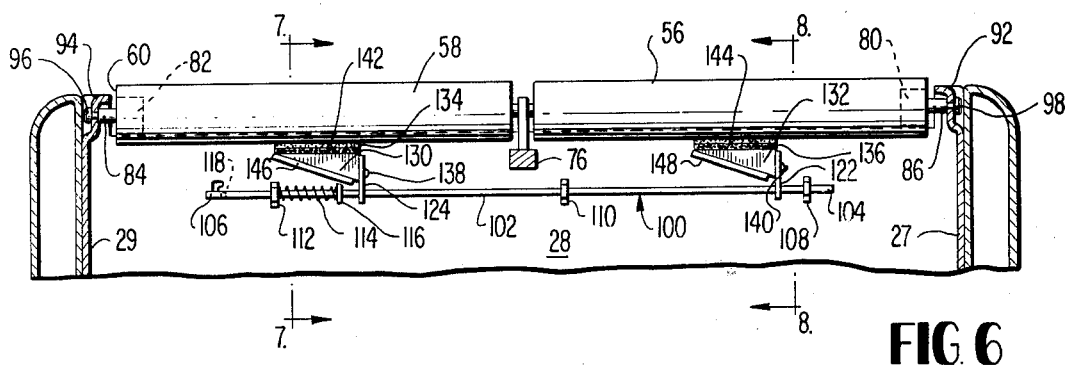
FIG. 6 is a sectional view opposite in direction to FIG. 2, showing details of the braking system.

FIGS. 5 and 6 show a modification of the end bearing means. Here, the ends 58 and 60 of the rollers 56, 58 have recesses therein to house bearings 80, 82. Stub axles 84, 86 extend into these bearings and are secured in place by allen screws 88, 90. The tailgate walls 27 and 29 in this form of the invention have indented portions 92 and 94 with openings through the axle extensions project.

Figure 7:
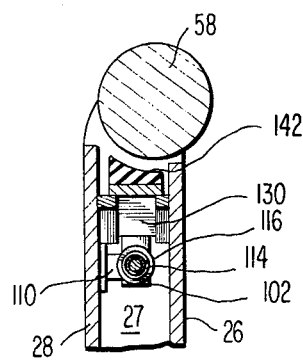
FIG. 7 is a transverse sectional view on line 7—7 of FIG. 6, looking in the direction of the arrows.
Figure 8:
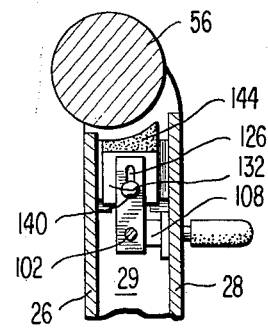
FIG. 8 is another transverse sectional view on line 8—8 of FIG. 6, looking in the direction of the arrows.

FIGS. 6 through 8 show the braking system 100 hereof. The system 100 comprises an elongated movable rod 102. The rod 102 has an inner end 104 and an outer end 106, and is mounted on brackets including a bracket 108 adjacent the end 104. A second bracket 110 is located at an intermediate position, and a third bracket 112 is positioned adjacent the end 106, all of the brackets extending from the wall 28. A spring 114 is coiled about the rod between the bracket 112 and a washer 116. A handle 118 extends through a compound slot 120 in the panel 28 for effecting side-to-side movement of the rod. The rod may be locked in its leftwise (FIG. 1) position by movement of the handle 118 into the vertical portion of the slot, the spring 114 exerting a constant bias to hold it in this position. Vertical plates 122, 124 are secured at fixed locations on the rod 102. The plates each has a vertical slot 126 therein. A pair of wedge blocks 130, 132 have vertical ends 134, 136 with projecting studs 138, 140 which extend through the slots 126 and permit movement between the wedge blocks and the plates. The studs have enlarged heads preventing withdrawal. Secured on the upper sides of the wedge blocks are fibrous brake pads 142, 144, shaped to frictionally engage the respective rollers. Inclined slides 146, 148 are secured to the panel walls, and are slidably contacted by the wedge members. Thus, sidewise movement of the rod effects movement of the wedge blocks on the slide members to engage or to disengage the brake pads from the rollers.

Figure 3:
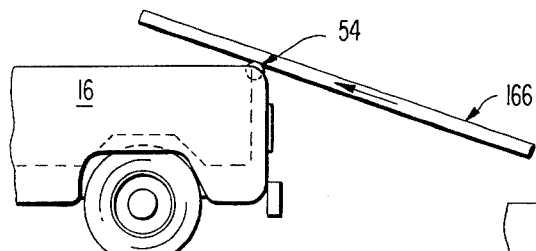
FIGS. 3 and 4 are partial side elevational views showing alternate operating positions of the loading tailgate assembly.
Figure 4:
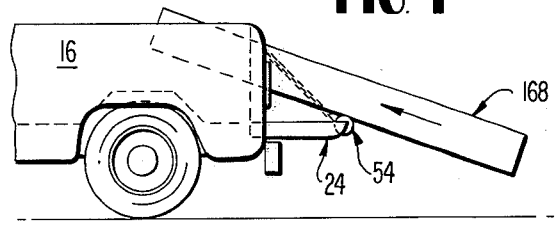

The operation of the invention involves employment to assist in loading or unleading heavy objects 166 or 168. It will be noted in FIGS. 3 and 4 that this may be accomplished by virtue of the projection of the roller outwardly of the gate, whether the tailgate is in vertical or horizontal position. Inasmuch as the system includes two independent rollers, the means may also be used after one side of the truck has been loaded with materials which project outwardly thereof. After loading, if the elongated objects still project outwardly of the truck, the brake system may be locked, thereby stabilizing the load.

I claim:

1. In a truck body having a bed, and having side frames, a loading tailgate comprising:
    tailgate end walls and tailgate inner and outer wall panels, the end walls being hingedly secured between the side frames of the truck body for movement between vertical and horizontal loading positions;
    loading roller means secured rotatably between said end walls and projecting at least partially outwardly of said end walls and inner and outer panels; and
    a brake system for the loading roller means, said brake system including a movable rod, and at least one brake pad moved by the rod to a position wherein it contacts the loading roller means and to a non-contact position.

2. In a truck body having a bed, and having side frames, a loading tailgate comprising:
    tailgate end walls and tailgate inner and outer wall panels, the end walls being hingedly secured between the side frames of the truck body;
    loading roller means secured rotatably between said end walls and projecting at least partially outwardly of said end walls and inner and outer panels;
    the tailgate end walls having upper ends;
    the tailgate inner and outer walls including top sections, said top sections each having an indented central portion and elevated side portions;
    a cover wall connecting each of said respective elevated side portions;
    bearing means comprising a cup member having an open, inwardly facing bore fixedly secured to the cover wall and upper end of the end wall; and
    the roller comprising an elongated, substantially cylindrical member having opposite ends and having stub axles projecting axially from each of said ends and rotatably seated, respectively, in said bearing means.

3. In a truck body having a bed, and having side frames, a loading tailgate comprising:
    tailgate end walls and tailgate inner and outer wall panels, the end walls being hingedly secured between the side frames of the truck body;
    loading roller means secured rotatably between said end walls and projecting at least partially outwardly of said end walls and inner and outer panels;
    a brake system for said roller means;
    the brake system comprising an elongated rod having wedge blocks thereon;
    the rod and blocks being laterally movable;
    inclined slide members on the tailgate walls;
    the blocks being in contact with the slide members and being elevated responsive to movement of the rod to move the blocks on the slide member; and
    brake pads on the blocks contacting the rollers when in elevated position.

* * * * *